(12) United States Patent
Mathis et al.

(10) Patent No.: US 6,468,179 B1
(45) Date of Patent: Oct. 22, 2002

(54) SIX SPEED PLANETARY TRANSMISSION WITH TWO OVERDRIVE RATIOS

(75) Inventors: Roland Mathis, Ribeauville; Marc Andres, Schiltigheim; Pierre Adolf, Erstein, all of (FR)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/853,018

(22) Filed: May 11, 2001

(51) Int. Cl.⁷ .............................................. F16H 3/62
(52) U.S. Cl. ...................................... 475/280; 475/338
(58) Field of Search ................................ 475/280, 296, 475/338

(56) References Cited

U.S. PATENT DOCUMENTS

| | | | | |
|---|---|---|---|---|
| 2,761,333 A | * | 9/1956 | Ravigneaux | 475/280 |
| 2,800,036 A | * | 7/1957 | Miller | 475/338 |
| 5,046,999 A | | 9/1991 | Liu et al. | 475/281 |
| 5,133,697 A | * | 7/1992 | Hattori | 475/276 |
| 5,577,976 A | | 11/1996 | Haka | 475/280 |
| 5,911,642 A | * | 6/1999 | Andres et al. | 475/10 |
| 6,364,804 B1 | * | 4/2002 | Haka | 475/278 |

FOREIGN PATENT DOCUMENTS

| | | | | |
|---|---|---|---|---|
| FR | 1042623 | * | 11/1953 | 475/280 |
| GB | 471394 | * | 9/1937 | 475/280 |

* cited by examiner

Primary Examiner—Sherry Estremsky
(74) Attorney, Agent, or Firm—Leslie C. Hodges

(57) ABSTRACT

A powertrain has a planetary transmission having a planetary gear arrangement and six torque transmitting mechanisms that are controlled to provide six forward ratios and a reverse ratio. The planetary gear arrangement includes two sun gear members, two ring gear members, and a planet carrier assembly member that are disposed in three axially spaced planes of gear mesh. The planet carrier member has a short pinion gear member, meshing (first plane) with one sun gear member, a first long pinion gear member having a small gear section, meshing (first plane) with the small pinion gear member and one ring gear member, and a large gear section, meshing(second plane) with the other sun gear member, and a second long pinion gear member, meshing (second and third planes) with both the large gear section (second plane) and the second ring gear member (third plane). The second long pinion gear member permits the pitch diameter of the second ring gear member to be radially inward of the pitch diameter of the first ring gear member.

5 Claims, 2 Drawing Sheets

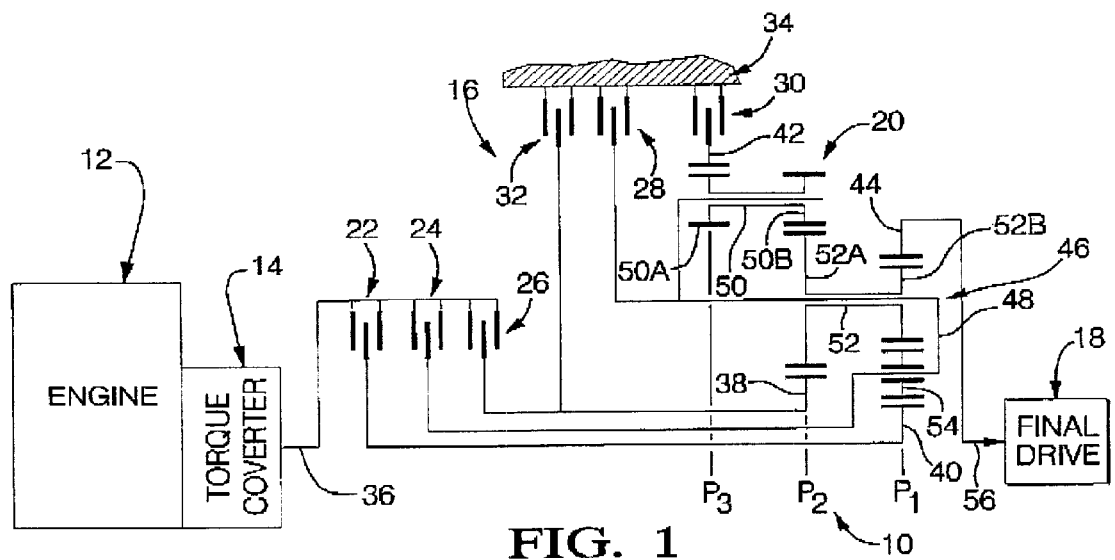

FIG. 1

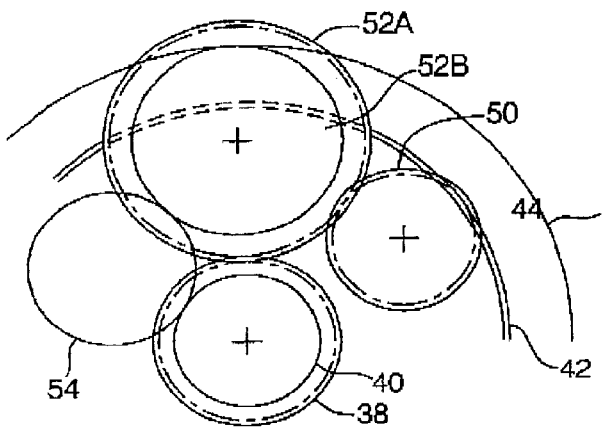

FIG. 2

| RATIOS | INPUT | 28 | 30 | 32 | RATIO VALUE * |
|---|---|---|---|---|---|
| Ratio 1 | 22 | X | | | $d2/a2$ |
| Ratio 2 | 22 | | X | | $(1=kd1/a2)/(1=kd1/d2)$ |
| Ratio 3 | 22 | | | X | $(1=ka1/a2)/(1=ka1/d2)$ |
| Ratio 4 | 22+24 | | | | 1 |
| Ratio 5 | 24 | | | X | $1/(1+ka1/d2)$ |
| Ratio 6 | 24 | | X | | $1/(1+kd1/d2)$ |
| Reverse | 26 | X | | | $-d2/(ka1)$ |

X = ENGAGED

*with d2 & d1 = number of teeth on 1st & 2nd ring gear
with a2 & a1 = number of teeth on 1st & 2nd sun gear
with p2 & p1 = number of teeth on gears referenced 52B & 52A
with k = p2 /p1
Assuming (for example only) that gears 50B & 50A have
have same number of teeth.

FIG. 3

SIX SPEED PLANETARY TRANSMISSION WITH TWO OVERDRIVE RATIOS

TECHNICAL FIELD

The present invention relates to power transmissions and more particularly to multi-speed power transmissions having six forward speed ratios.

BACKGROUND OF THE INVENTION

Multi-speed power transmissions are incorporated into powertrains to provide an extended operating range for the internal combustion engine that supplies the power for the powertrain. The number of ratios that are incorporated into automatic transmissions, especially for passenger car and small truck usage, has increased from two forward speed ratios to five forward speed ratios. Currently some manufacturers are considering transmissions incorporating six forward speed ratios. Examples of such proposals can be seen in the United States Patents issued to Liu and Malloy (U.S. Pat. No. 5,046,999) on Sep. 10, 1991 and Haka (U.S. Pat. No. 5,577,976) on Nov. 26, 1996.

These transmissions generally employ a Ravigneaux gear arrangement comprised of a long pinion and two or more short pinions that are intermeshing. The pinions interconnect two sun gears and two ring gears. By combining at least six selectively operable torque transmitting mechanisms (clutches and brakes), six forward speed ratios and one reverse ratio is available. The gears of these planetary arrangements are aligned in two axial planes. However the overdrive ratios achieved with these arrangements have a large step and the sixth ratio has a low numerical value.

Other six speed transmissions, having three axial planes of gears, have been proposed. One such mechanism is shown in U.S. Pat. No. 4,070,927 issued to Polak on Jan. 1, 1978. This arrangement uses three simple interconnected planetary gear sets and five torque transmitting mechanisms. The transmission described in the Polak patent has been used extensively in large trucks.

SUMMARY OF THE INVENTION

It is an object of the present invention to provide an improved multi-speed power transmission having six forward ratios and one reverse ratio.

In one aspect of the present invention, the transmission has a compound gear arrangement including two sun gear members and two ring gear members that are interconnected by a plurality of intermeshing pinion gears laid out in three axial planes. In another aspect of the present invention, at least one of the intermeshing pinion gears is a stepped pinion gear. In yet another aspect of the present invention, one of the ring gear members is an output member and the other ring gear member is a reaction member during two of the forward ratios.

In still another aspect of the present invention, the reaction ring gear member is smaller in diameter than the output ring gear member. In a further aspect of the present invention, the reaction ring gear member is disposed in one axial plane, the output ring gear member is disposed in another axial plane. In yet a further aspect of the present invention the planes containing the ring gear members are separated by an axial plane containing one of the sun gear members. In still a further aspect of the present invention, six torque transmitting mechanisms are employed to selectively provide six forward ratios, including two overdrive ratios, and a reverse ratio wherein the highest overdrive ratio is equal to or greater than 0.50.

BRIEF DESCRIPTION OF THE DRAWINGS

FIG. 1 is a schematic representation of a gearing arrangement incorporating the present invention.

FIG. 2 is a schematic representation of an end view of the gearing shown in FIG. 1.

FIG. 3 is a truth table of the engagement sequence of the torque transmitting mechanisms for the gearing arrangement.

DESCRIPTION OF EXEMPLARY EMBODIMENTS

Figure 4:
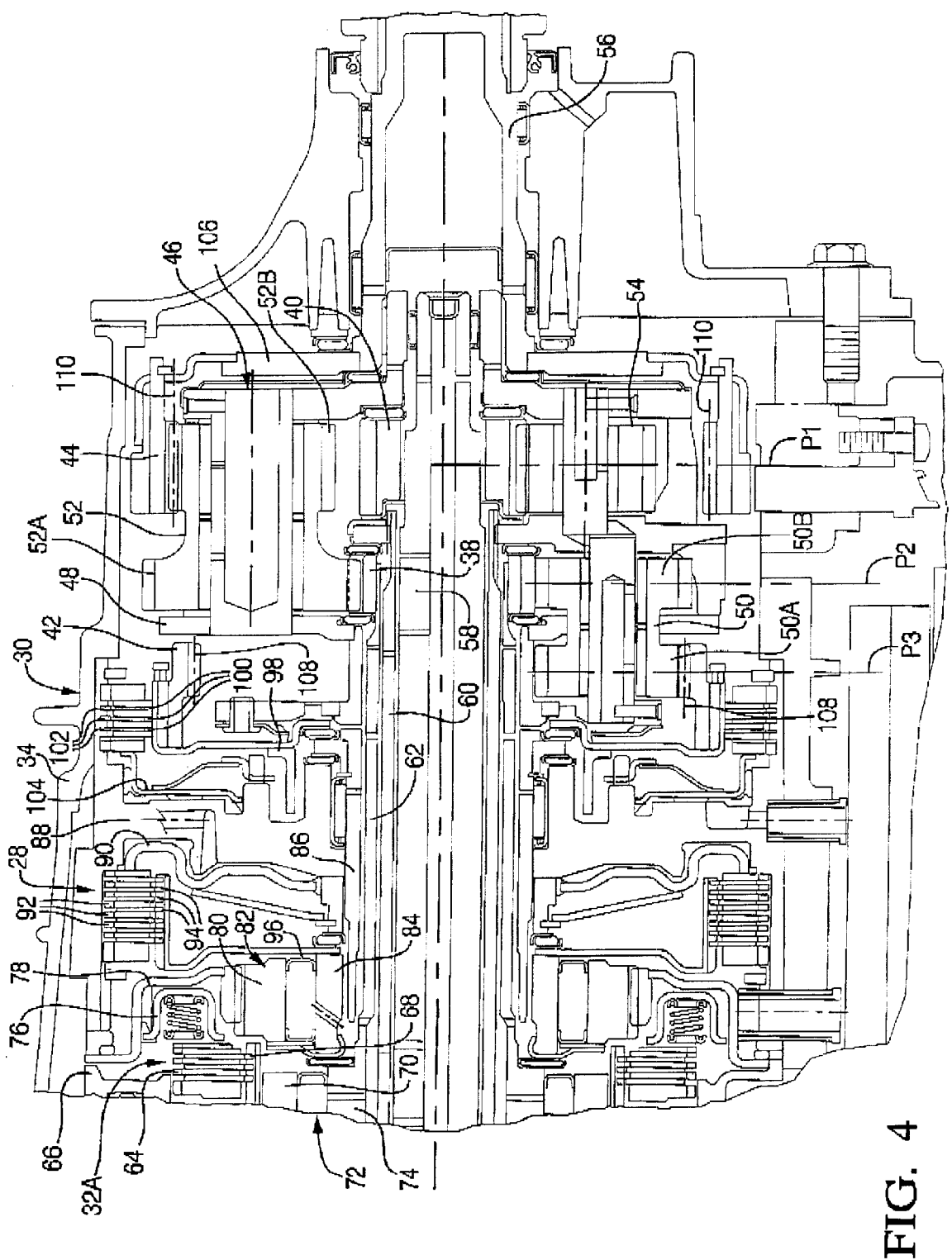
FIG. 4 is an elevational view of the gearing arrangement incorporating the present invention and a portion of a transmission in which the gearing is assembled.

Referring to the drawings wherein like characters represent the same or corresponding components throughout the several views, there is seen in FIGS. 1 and 4 a powertrain 10 incorporating a conventional engine or prime mover 12, a conventional torque converter 14, a multi-speed power transmission 16 and a conventional final drive gearing 18. The final drive gearing 18 is drivingly connected to the drive wheels of a vehicle, not shown. The engine 12 and transmission 16 preferably include an electronic control module ECU, not shown, which ECU supplies control signals to the engine 12 and transmission 16 in response to operating parameter signals such as throttle position, engine speed, transmission input and output speeds, vehicle speed, and temperatures to name a few. The ECU typically includes a programmable digital computer that receives the operating signals and issues command to the engine 12 and transmission 16 to control fuel feed, fluid pressures, and transmission ratio interchanges.

The multi-speed transmission 16 includes a planetary gear arrangement 20, three rotating torque transmitting mechanisms or clutches 22, 24 and 26, and three stationary torque transmitting mechanisms or brakes 28, 30 and 32. The torque transmitting mechanisms 22, 24, 26, 28, 30, and 32 are conventional fluid operated selectively operable mechanisms which, when engaged, will transmit torque to and from the planetary gearing. The stationary torque transmitting mechanisms 28, 30, and 32 will transmit torque, when engaged, from the planetary gearing 20 to a transmission housing 34 while the rotating torque transmitting mechanisms 22, 24, and 26 will transmit torque, when engaged, from an input shaft 36 to the planetary gearing.

The planetary gearing arrangement 20 includes two sun gear members 38 and 40, two ring gear members 42 and 44, and a planetary carrier assembly member 46. The planetary carrier assembly member 46 has a planet carrier 48 on which is rotatably mounted a plurality of pinion gear members 50, 52 and 54. The pinion gear member 50 is a long pinion with two gear sections 50A and 50B that are equal diameter. In the alternative, the pinion gear member 50 can have the teeth formed continuously if this is more economical during manufacturing. The pinion gear member 52 is a long pinion with two gear sections 52A and 52B. Gear section 52A is of larger diameter than gear section 52B. The pinion gear member 54 is a short pinion that meshes between the sun gear member 40 and the gear section 52B. The gear section 52B also meshes with the ring gear member 44. The gear section 52A meshes with the sun gear member 38 and the gear section 50B. The gear section 50A meshes with the ring gear member 42. The gear meshes are distributed into three axial gear mesh planes P1, P2, and P3. The sun gear member 40, pinion gear member 54 and small gear section 52B are meshing in the plane P1. The sun gear member 38, large gear section 52A and the pinion gear member 50 are meshing in the plane P2. The ring gear member 42 and the pinion gear member 50 are meshing in the plane P3.

The torque transmitting mechanism 22 is selectively connectable between the input shaft 36 and the sun gear member 40. The torque transmitting mechanism 24 is selectively connectable between the input shaft 36 and the planetary carrier assembly member 46. The torque transmitting mechanism 26 is connectable between the input shaft 36 and the sun gear member 38. The torque transmitting mechanism 28 is selectively connectable between the planetary carrier assembly member 46 and the housing 34. The torque transmitting mechanism 30 is selectively connectable between the ring gear member 42 and the housing 34. The torque transmitting mechanism 32 is selectively connectable between the sun gear member 38 and the housing 34. The torque transmitting mechanisms 22, 24, 26, 28, 30, and 32 are selectively engageable in combinations of two to establish six forward speed ratios and one reverse ratio between the input shaft 36 and an output shaft 56 that is connected between the ring gear member 44 and the final drive gearing 18, as shown in FIG. 1.

As best seen in FIG. 4, the sun gear member 40 is splined to a shaft 58 that is operatively connected with the torque transmitting mechanism 22, not shown in FIG. 4. The planet carrier 48 of the planetary carrier assembly member 46 is drivingly connected with a sleeve shaft 60 that is operatively connected with the torque transmitting mechanism 24. The sun gear member 38 is splined to a sleeve shaft 62 that is operatively connected with a torque transmitting mechanism 32A and both the torque transmitting mechanism 32 and the torque transmitting mechanism 26, not shown. The torque transmitting mechanism 32A is disposed in parallel operating relation with the torque transmitting mechanism 32 and includes a plurality of friction plates 64 that are splined to an intermediate housing 66 which is secured in the transmission housing 34. The torque transmitting mechanism 32A also has a plurality of friction plates 68 that are splined to the outer race 70 of a one-way torque transmitting mechanism 72. An inner race 74 of the one-way mechanism 72 is drivingly connected with the sleeve shaft 62. A fluid operated piston 76 is slidably disposed in a housing 78 that is secured to the transmission housing 34 and also to the outer race 80 of a one-way torque transmitting mechanism 82. When the torque transmitting mechanism 32A is engaged, the sun gear member 38 is restrained from reverse rotation but is free to rotate in the forward direction. When the torque transmitting mechanism 32 is engaged, the sun gear member 38 is restrained from rotation in either direction.

The one-way mechanism 82 has an inner race 84 that is drivingly connected, through a sleeve shaft 86, with the planet carrier 48 of the planetary carrier assembly member 46 to restrain reverse rotation thereof. The sleeve shaft 86 is also connected with the torque transmitting mechanism 28 which includes a housing 88 that is secured to the housing 34 and in which is slidably disposed a piston 90. A plurality of friction plates 92 are drivingly connected with the housing 88 and a second plurality of friction plates 94 are drivingly connected with a hub 96 that is connected with the sleeve shaft 86. Whenever the torque transmitting mechanism 28 is engaged, the planet carrier 48 is restrained from rotation in both directions.

The housing 88 rotatably supports a hub 98 that is secured to the ring gear member 42 and is drivingly connected with a plurality of friction plates 100 that are components of the torque transmitting mechanism 30. The torque transmitting mechanism 30 also includes another plurality of friction plates 102, alternately spaced with the plates 100, and a piston member 104 that is slidably disposed in the housing 88. When the torque transmitting mechanism 30 is engaged by fluid pressure acting on the piston 104, the ring gear member 42 is restrained from rotation in both the forward and reverse directions. The ring gear member 44 is continuously connected with the output shaft 56 through a hub 106. As best seen in FIG. 4, the ring gear member 42 has a pitch diameter 108 that is disposed radially inward of a pitch diameter 110 of the ring gear member 44 which allows the present gearing arrangement to be installed in an envelope consistent in radial size with current four and five speed transmissions. The smaller pitch diameter of the ring gear member 42 and the stepped pinion gear member 52 also allows the overdrive ratios to have relatively large numerical ratios.

The one-way torque transmitting mechanisms 72 and 82 are employed to improve the shift feel between first and second and between second and third. These mechanisms are not necessary for the benefits derived from the present invention. With the use of electronic shift controls in the ECU, "clutch to clutch" shifts are achieved with a minimum of driveline disturbance. However, the use of the one-way torque transmitting mechanism, while adding mechanical content, will reduce the control function restraints imposed on the ECU. These features neither add to nor subtract from the present invention.

The truth table of FIG. 3 describes the engagement and interchange of the torque transmitting mechanisms for the forward and reverse ratios. To establish the reverse ratio, the torque transmitting mechanisms 26 and 28 are engaged. This establishes the sun gear member 38 as an input member and the planet carrier assembly member 46 as a reaction member. The numerical value of the reverse ratio is determined by the tooth ratio of the ring gear member 44, the sun gear member 38 and the ratio of the small gear section 52B to the large gear section 52A, hereinafter "pinion ratio".

The first forward ratio is established by the engagement of the torque transmitting mechanisms 22 and 28. Note that a forward/reverse interchange can be achieved by the swap of the torque transmitting mechanisms 22 and 26. In the first forward ratio, the sun gear member 40 is an input member and the planet carrier assembly member 46 is a reaction member. The numerical value of the first forward ratio is determined by the number of teeth on the sun gear member 40 and the ring gear member 44 (the gear meshes in plane 1). The first forward ratio is an underdrive ratio.

To establish the second forward ratio, the torque transmitting mechanism 28 is disengaged and the torque transmitting mechanism 30 is engaged. This interchange is controlled by the ECM. In the second forward ratio, the sun gear member 40 is the input member and the ring gear member 42 is a reaction member. The numerical value of the second forward ratio is determined by the tooth ratio of the ring gear member 42 to the sun gear member 40, the tooth ratio of the ring gear member 42 to the ring gear member 44, and the pinion ratio (the gear meshes in planes 1,2 and 3). The interchange from first to second is a single transition shift. The second forward ratio is an underdrive ratio.

To establish the third forward ratio, the torque transmitting mechanisms 30 and 32 are interchanged. The sun gear member 40 remains the input member and the sun gear member 38 is the reaction member. The numerical value of the third forward ratio is determined by the tooth ratio of the sun gear member 38 to the sun gear member 40, the sun gear member 28 to the ring gear member 44 and the pinion ratio (the gear meshes in planes 1 and 2). The interchange from second to third is a single transition shift. The third ratio is an underdrive ratio.

To establish the fourth forward ratio, the torque transmitting mechanisms 32 and 24 are interchanged. The planet carrier assembly member 46 and the sun gear member 40 are both input members and the planetary gear arrangement 20 is in a direct drive or one to one ratio. The interchange from third to fourth is a single transition shift.

To establish the fifth forward ratio, the torque transmitting mechanisms 22 and 32 are interchanged. This establishes the planet carrier assembly member 46 as an input member and the sun gear member 38 as a reaction member. The numerical value of the fifth forward ratio is determined by the tooth ratio of the sun gear member 38 to the ring gear member 44 and the pinion ratio (the gear meshes in planes 1 and 2). The fifth forward ratio is an overdrive ratio. The interchange from fourth to fifth is a single transition shift.

To establish the sixth forward ratio, the torque transmitting mechanisms 32 and 30 are interchanged in a single transition shift. The planet carrier assembly member 46 remains the input member and the ring gear member 42 becomes the reaction member. The numerical value of the sixth forward ratio is determined by the tooth ratio of the ring gear member 42 to the ring gear member 44 and the pinion ratio (the gear meshes in planes 1, 2, and 3). The sixth forward ratio is also an overdrive ratio.

The above interchanges are described for an upshift pattern. It will be apparent to those skilled in the art that the downshift pattern is the opposite and that all single step downshifts will be of the single transition type. The double step shifts ($1^{st}$ to $3^{rd}$, $2^{nd}$ to $4^{th}$, $3^{rd}$ to $5^{th}$, and $4^{th}$ to $6^{th}$) are all single transition also. It will also be appreciated that the pinion ratio affects all of the ratios except first forward and fourth forward.

The following are examples of the ratios that can be achieved with the present invention when the given gear tooth numbers are employed.

| Gear Member | No. of teeth Example 1 | No. of teeth Example 2 |
| --- | --- | --- |
| Sun gear member 38 | 36 | 33 |
| Sun gear member 40 | 31 | 31 |
| Pinion gear member 50 50A = 50B | 30 | 30 |
| Pinion gear member 54 | 27 | 28 |
| Pinion gear member 52 gear section 52A | 42 | 45 |
| Pinion gear member 52 gear section 52B | 31 | 33 |
| Ring gear member 42 | 99 | 93 |
| Ring gear member 44 | 109 | 112 |

| Ratio established | Numerical value Example 1 | Numerical value Example 2 |
| --- | --- | --- |
| $1^{st}$ forward | 3.51 | 3.61 |
| $2^{nd}$ forward | 2.00 | 1.99 |
| $3^{rd}$ forward | 1.49 | 1.46 |
| $4^{th}$ forward | 1.00 | 1.00 |
| $5^{th}$ forward | 0.80 | 0.82 |
| $6^{th}$ forward | 0.59 | 0.62 |
| Reverse | 4.10 | 4.63 |

What is claimed is:

1. A multi-speed planetary transmission comprising:

an input shaft for delivering power to the transmission;

an output shaft for delivering power from the transmission;

a planetary gear arrangement comprising a first sun gear member, a second sun gear member, a first ring gear member, a second ring gear member, and a planet carrier assembly member having a planet carrier rotatably supporting a plurality of pinion gear members including a first pinion gear member meshing with said first sun gear member, a second pinion gear member having a first gear section meshing with both said first pinion gear member and said first ring gear member and a second gear section meshing with said second sun gear member, and a third pinion gear member meshing with said second gear section and said second ring gear member, said first ring gear member being continuously connected with said output shaft;

a first torque transmitting mechanism selectively operatively connected between said input shaft and said first sun gear member;

a second torque transmitting mechanism selectively operatively connected between said planet carrier assembly member and said input shaft;

a third torque transmitting mechanism selectively operatively connected between said second sun gear member and said input shaft;

a fourth torque transmitting mechanism selectively operatively connected between said planet carrier assembly member and a transmission housing;

a fifth torque transmitting mechanism selectively operatively connected between said second ring gear member and said transmission housing;

a sixth torque transmitting mechanism selectively operatively connected between said second sun gear member and said transmission housing; and said six torque transmitting mechanisms being selectively engaged in combinations of two to establish six forward ratios and one reverse ratio between said input shaft and said output shaft.

2. The multi-speed planetary transmission defined in claim 1 further comprising:

said second sun gear member and said second gear section being disposed in a gear plane axially intermediate gear planes containing said first ring gear member and said second ring gear member respectively.

3. A multi-speed planetary transmission comprising:

an input shaft for delivering power to the transmission;

an output shaft for delivering power from the transmission;

a planetary gear arrangement comprising a first sun gear member disposed in a first gear mesh plane, a second sun gear member disposed in a second gear mesh plane, a first ring gear member disposed in a first gear mesh plane, a second ring gear member disposed in a third gear mesh plane, and a planet carrier assembly member having a planet carrier rotatably supporting a plurality of pinion gear members including a first pinion gear member meshing with said first sun gear member in said first gear mesh plane, a second pinion gear member having a first gear section meshing with both said first pinion gear member and said first ring gear member in said first gear mesh plane and a second gear section meshing with said second sun gear member in said second gear mesh plane, and a third pinion gear member meshing with said second gear section in said second gear mesh plane and with said second ring gear member in said third gear mesh plane, said first ring gear member being continuously connected with said output shaft, and said second gear mesh plane being disposed axially between said first and third gear mesh planes;

a first torque transmitting mechanism selectively operatively connected between said input shaft and said first sun gear member;

a second torque transmitting mechanism selectively operatively connected between said planet carrier assembly member and said input shaft;

a third torque transmitting mechanism selectively operatively connected between said second sun gear member and said input shaft;

a fourth torque transmitting mechanism selectively operatively connected between said planet carrier assembly member and a transmission housing;

a fifth torque transmitting mechanism selectively operatively connected between said second ring gear member and said transmission housing;

a sixth torque transmitting mechanism selectively operatively connected between said second sun gear member and said transmission housing; and said six torque transmitting mechanisms being selectively engaged in combinations of two to establish six forward ratios and one reverse ratio between said input shaft and said output shaft.

4. The multi-speed planetary transmission defined in claim 3 further comprising:

said first ring gear member having a pitch diameter and said second ring gear member having a pitch diameter numerically smaller than said pitch diameter of said first ring gear member.

5. The multi-speed planetary transmission defined in claim 3 further comprising:

said first gear mesh plane being disposed axially adjacent said output shaft.

* * * * *